(12) United States Patent
Hwang (10) Patent No.: US 9,170,083 B2
(45) Date of Patent: Oct. 27, 2015

(54) WHEEL ALIGNMENT MEASURING DEVICE FOR VEHICLE AND MEASURING SYSTEM AND MEASURING METHOD USING THE SAME

(71) Applicant: Hyundai Motor Company, Seoul (KR)

(72) Inventor: Tae Mun Hwang, Gimje-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 142 days.

(21) Appl. No.: 14/065,126

(22) Filed: Oct. 28, 2013

(65) Prior Publication Data

US 2015/0040410 A1 Feb. 12, 2015

(30) Foreign Application Priority Data

Aug. 7, 2013 (KR) .................. 10-2013-0093535

(51) Int. Cl.
*G01B 11/275* (2006.01)
*G01B 5/255* (2006.01)

(52) U.S. Cl.
CPC ............ *G01B 5/255* (2013.01); *G01B 11/2755* (2013.01); *G01B 2210/14* (2013.01)

(58) Field of Classification Search
CPC .... G01B 11/27; G01B 11/272; G01B 11/275; G01B 11/2755
USPC ................................ 33/288, 608; 356/139.09
See application file for complete search history.

(56) References Cited

U.S. PATENT DOCUMENTS

| | | | | |
|---|---|---|---|---|
| 4,615,618 | A * | 10/1986 | Bailey et al. ............ | 356/139.09 |
| 4,663,855 | A * | 5/1987 | Hamilton et al. ............... | 33/288 |
| 4,811,250 | A * | 3/1989 | Steber et al. .................. | 702/152 |
| 5,978,077 | A | 11/1999 | Koerner et al. | |
| 6,053,766 | A | 4/2000 | Muramatsu et al. | |
| 7,774,946 | B2 * | 8/2010 | Boni et al. ................. | 33/203.18 |
| 7,908,751 | B2 * | 3/2011 | Nobis et al. .................... | 33/288 |
| 8,020,307 | B2 * | 9/2011 | Schwindt ....................... | 33/288 |
| 8,418,543 | B2 * | 4/2013 | Tentrup et al. ............. | 73/117.02 |
| 8,448,342 | B2 * | 5/2013 | Nobis et al. ...................... | 33/288 |
| 8,836,764 | B2 * | 9/2014 | Gruetzmann et al. .......... | 348/46 |
| 2011/0040443 | A1 * | 2/2011 | Brauer ............................ | 701/33 |
| 2014/0219509 | A1 * | 8/2014 | Buzzi et al. .................. | 382/104 |
| 2014/0253908 | A1 * | 9/2014 | Lee ............................ | 356/139.09 |
| 2015/0045929 | A1 * | 2/2015 | Lee et al. ...................... | 700/114 |

FOREIGN PATENT DOCUMENTS

| | | | |
|---|---|---|---|
| JP | 6-344942 | A | 12/1994 |
| JP | 10-2726 | A | 1/1998 |

(Continued)

*Primary Examiner* — Christopher Fulton
(74) *Attorney, Agent, or Firm* — Morgan, Lewis & Bockius LLP (57) ABSTRACT

A wheel alignment measuring device using a body center line of a vehicle includes: front laser sensors provided at both sides of a front of a workbench on which the vehicle is disposed to measure positions of side panels each provided at both sides of a front of the vehicle; rear laser sensors at both sides of a rear of the workbench to measure positions of the side panels each provided at both sides of a rear of the vehicle; and a measuring unit configured to connect a center point A of a connection line connecting two points of a front of the side panels measured by the front laser sensors and a center point B of a connection line connecting two points of a rear of the side panels measured by the rear laser sensors to obtain a body center line C of the vehicle.

12 Claims, 6 Drawing Sheets

(56) References Cited

FOREIGN PATENT DOCUMENTS

| JP | 11-31408 A | 2/1999 |
|---|---|---|
| JP | 2001-507131 A | 5/2001 |
| KR | 1998-033400 A | 7/1998 |
| KR | 20-0324989 Y1 | 9/2003 |
| KR | 10-2009-0052329 A | 5/2009 |
| KR | 10-2010-0129863 A | 12/2010 |
| WO | WO 98/28595 A1 | 7/1998 |
| WO | WO 2008/022693 A1 | 2/2008 |

* cited by examiner

WHEEL ALIGNMENT MEASURING DEVICE FOR VEHICLE AND MEASURING SYSTEM AND MEASURING METHOD USING THE SAME

CROSS-REFERENCE TO RELATED APPLICATION

The present application claims priority of Korean Patent Application Number 10-2013-0093535 filed Aug. 7, 2013, the entire contents of which application is incorporated herein for all purposes by this reference.

BACKGROUND OF INVENTION

1. Field of Invention

The present invention relates to a wheel alignment measuring device for a vehicle measuring a wheel alignment based on a body center line in order to improve straight driving performance of the vehicle when a driving drift, unbalanced wear of a tire, deflected driving, or the like, occur, and a measuring system and a measuring method using the same.

2. Description of Related Art

Figure 1:
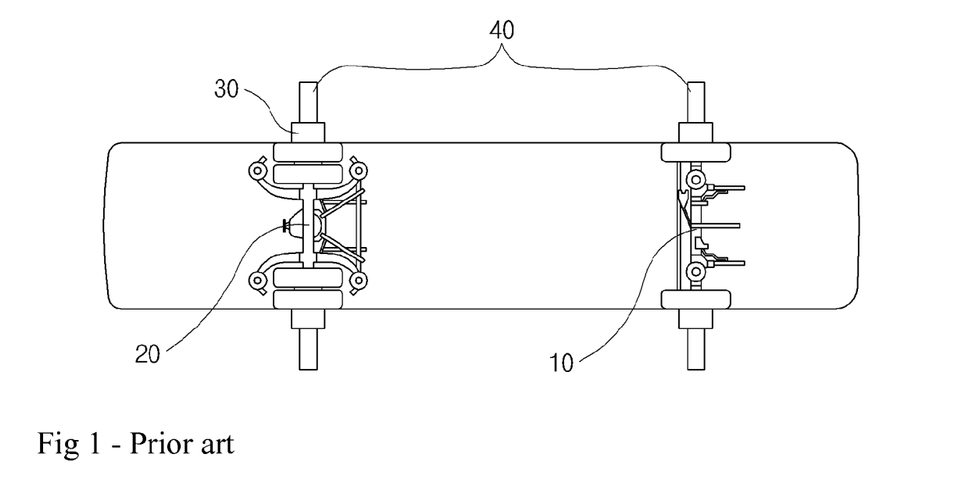
FIG. 1 is a view showing a state measuring wheel alignment of a vehicle according to the related art.
Figure 2:
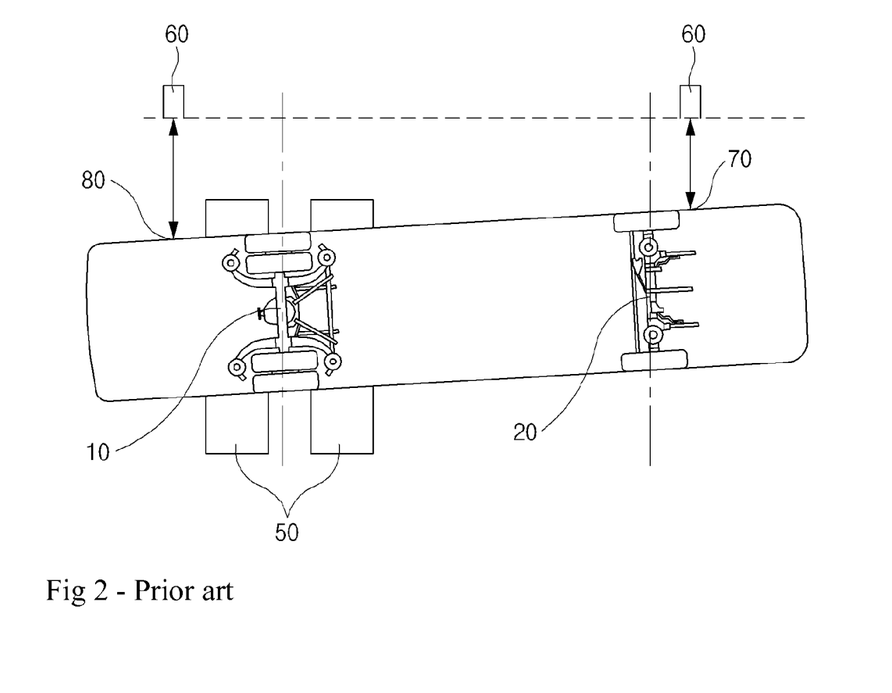
FIG. 2 is a view showing a state measuring deflection of the vehicle according to the related art.

In general, a large-sized bus measures and adjusts contact-type wheel alignment and deflection in order to improve straight driving performance. That is, the wheel alignment measurement measures the wheel alignment using wheel clamps 30 and 3D cameras 40 installed on wheel surfaces of a steering shaft 10 and a driving shaft 20 as shown in FIG. 1, and the deflection measurement measures a distance by ultrasonic sensors 60 while a vehicle is driven by roll tester rollers 50 in a roll test process and calculates a displacement difference between a front part 70 and a rear part 80 of a vehicle outer plate using the measured distance, as shown in FIG. 2.

Meanwhile, a wheel alignment measuring device for the vehicle has been disclosed in Korean Utility Model Registration No. 20-0324989.

However, the wheel alignment measuring device according to the related art may have quality problems such as a driving drift, deflected driving, and the like due to being out-of-square when offsets of the steering shaft 10 and the driving shaft 20 occur at the time of the measurement and adjustment of the wheel alignment, and a problem that it is difficult to accurately measure a deflected amount due to occurrence of left and right movements of a roller caused by characteristic of an automatic centering adjustment type roller bearing 50 used in the roll tester at the time of the measurement of the deflection.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, the present invention has been made to solve the above-mentioned problems occurring in the prior art while advantages achieved by the prior art are maintained intact.

Various aspects of the present invention provide for a wheel alignment measuring device for a vehicle measuring a wheel alignment based on a body center line in order to improve straight driving performance of the vehicle when a driving drift, unbalanced wear of a tire, deflected driving, or the like occur.

Various aspects of the present invention provide for a measuring system and a measuring method of the wheel alignment for the vehicle measuring torsion and deflection of the wheel alignment using the wheel alignment measuring device.

In one aspect of the present invention, there is provided a wheel alignment measuring device for a vehicle, the device including: a workbench configured to dispose the vehicle thereon; front laser sensors configured to be each provided at both sides of a front of the workbench and measure positions of side panels each provided at both sides of a front of the vehicle; rear laser sensors configured to be each provided at both sides of a rear of the workbench and measure positions of the side panels each provided at both sides of a rear of the vehicle; and a measuring unit configured to obtain a front center point A of a connection line connecting two points of a front of the side panels measured by the front laser sensors and a rear center point B of a connection line connecting two points of a rear of the side panels measured by the rear laser sensors, and a body center line C of the vehicle by connecting the front center point A and the rear center point B to each other.

The front laser sensors may be provided at both sides of the front of the workbench so as to correspond to each other.

The rear laser sensors may be provided at both sides of the rear of the workbench so as to correspond to each other.

The front laser sensors and the rear laser sensors each provided at both side portions of the workbench may be provided on the same line in a length direction of the vehicle.

In another aspect of the present invention, there is provided a wheel alignment measuring system for a vehicle, the system including: the wheel alignment measuring device as described above; and wheel clamps and 3D cameras configured to be provided at ends of both sides of a steering shaft or a driving shaft of the vehicle and measure a reference line connecting both ends of the steering shaft or the driving shaft.

After measuring a connected state between the reference line of the steering shaft measured by the wheel clamps and the 3D cameras and the body center line, if an angle of the reference line of the steering shaft with respect to the body center line is not 90°, deflection may occur.

After measuring a connected state between the reference line of the driving shaft measured by the wheel clamps and the 3D cameras and the body center line, if an angle of the reference line of the driving shaft with respect to the body center line is not 90°, torsion may occur.

In another aspect of the present invention, there is provided a wheel alignment measuring method for a vehicle, the method including: a front measuring step of each measuring positions of side panels each provided at both sides of a front of the vehicle to obtain two front points; a rear measuring step of each measuring positions of side panels each provided at both sides of a rear of the vehicle to obtain two rear points; a front and rear center points measuring step of obtaining a front center point A of a connection line connecting the two front points to each other and a rear center point B of a connection line connecting the two rear points to each other; a body center line measuring step of connecting the front center point A and the rear center point B to each other to obtain a body center line C of the vehicle; a steering shaft or driving shaft reference line measuring step of measuring a reference line D or E of the steering shaft or the driving shaft connecting both ends of the steering shaft or the driving shaft of the vehicle; and a torsion and deflection measuring step of measuring an inclined angle of the reference line D or E of the steering shaft or the driving shaft based on the body center line C and then measuring torsion and deflection of the driving shaft and the steering shaft of the vehicle.

In the front measuring step, the positions of the side panels each provided at both sides of front of the vehicle may be measured by front laser sensors to thereby obtain two front points.

In the rear measuring step, the positions of the side panels each provided at both sides of the rear of the vehicle may be measured by rear laser sensors to thereby obtain two rear points.

In the steering shaft or driving shaft reference line measuring step, a reference line D or E of the steering shaft or the driving shaft connecting both ends of the steering shaft or the driving shaft may be measured by wheel clamps and 3D cameras each provided at ends of both sides of the steering shaft or the driving shaft.

In the torsion and deflection measuring step, an angle of the reference line D of the steering shaft may be measured based on the body center line C, and if the angle of the steering shaft is not 90°, deflection may occur.

In the torsion and deflection measuring step, an angle of the reference line E of the driving shaft may be measured based on the body center line C, and if the angle of the driving shaft is not 90°, torsion may occur.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A wheel alignment measuring device according to various embodiments to the present invention is a device capable of measuring four points at both sides, a front, and a rear of a vehicle using a laser sensor, obtaining a body center line of the vehicle using the above-mentioned four points, measuring wheel alignment by an inclined state of a steering shaft and a driving shaft based on the above-mentioned body center line, and more accurately adjusting the wheel alignment by adjusting the inclined state between the steering shaft and the driving shaft based on the body center line.

Figure 3:
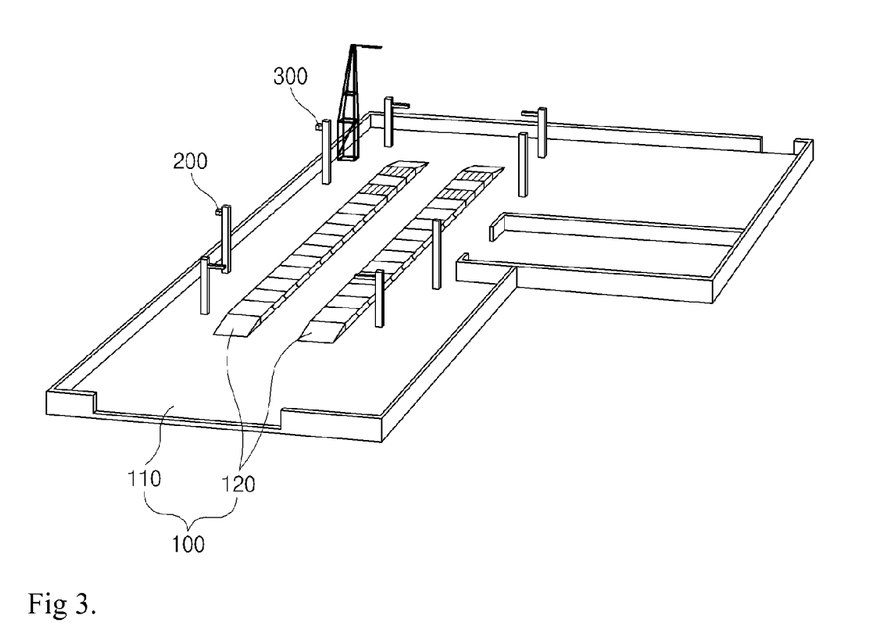
FIG. 3 is a perspective view showing an exemplary wheel alignment measuring device for a vehicle according to the present invention.
Figure 4:
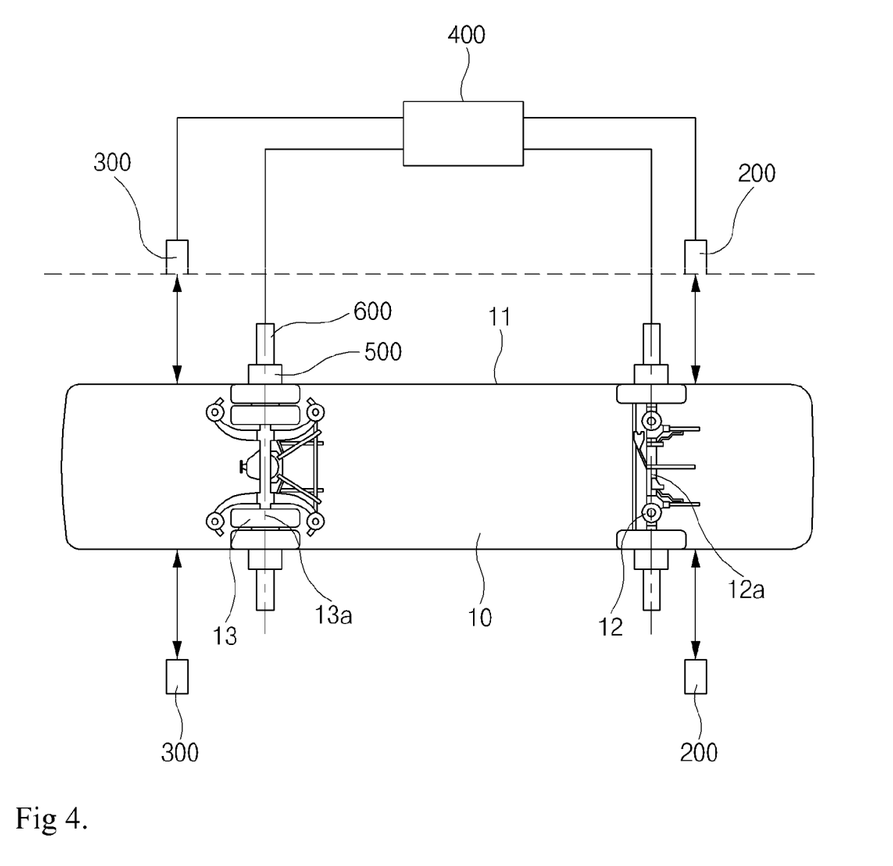
FIG. 4 is a plan view showing an exemplary wheel alignment measuring system for a vehicle according to the present invention.

As shown in FIGS. 3 and 4, the wheel alignment measuring device for the vehicle, which measures the wheel alignment using the body center line of the vehicle, includes a workbench 100 on which the vehicle is disposed, front laser sensors 200 each provided at both sides of a front of the workbench 100 and measuring front positions of side panels 11 each provided at both sides of the vehicle 10, rear laser sensors 300 each provided at both sides of a rear of the workbench 100 and measuring rear positions of the side panels 11 each provided at both sides of the vehicle 10, and a measuring unit 400 connecting a center point A of a connection line connecting two points of the front of the side panels 11 determined and measured by the front laser sensors 200 and a center point B of a connection line connecting two points of the rear of the side panels 11 determined and measured by the rear laser sensors 300 to each other to thereby obtain a body center line C of the vehicle.

The workbench 100 includes a bottom part 110 on which the vehicle is disposed and guide parts 120 provided on the bottom part 110 and guiding a position of the vehicle 10 so as to be constantly maintained while the vehicle 10 is mounted.

The front laser sensors 200 are provided at both sides of the front of the workbench 100 so as to correspond to each other, determines and measures the front positions of the side panels 11 provided at both sides of the vehicle 10, and transmits the measured result value to the measuring part 400, thereby making it possible to obtain the front center point A of the connection line connecting the two points of the front of the side panels 11 by the measuring part 400.

That is, the front laser sensors 200 are disposed so as to correspond to each other, such that the two points of the front of the side panels 11 may be determined and measured so as to be connected to each other. Therefore, the front center point A may be accurately obtained.

The rear laser sensors 300 are provided at both sides of the rear of the workbench 100 so as to correspond to each other, determines and measures the rear positions of the side panels 11 provided at both sides of the vehicle 10, and transmits the measured result value to the measuring part 400, thereby making it possible to obtain the rear center point B of the connection line connecting the two points of the rear of the side panels 11 by the measuring part 400.

That is, the rear laser sensors 300 are disposed so as to correspond to each other, such that the two points of the rear of the side panels 11 may be determined and measured so as to be connected to each other. Therefore, the rear center point B may be accurately obtained.

Meanwhile, the front laser sensors 200 and the rear laser sensors 300 each provided at both side portions of the workbench 100 are positioned on the same line in a length direction of the vehicle. Therefore, if four points determined and measured by the front laser sensors 200 and the rear laser sensors 300 are connected, a rectangle is formed, such that the center point may be more accurately obtained.

As such, the measuring part 400 may determine and measure the body center line C by connecting the front center point A and the rear center point B to each other measured by the front laser sensors 200 and the rear laser sensors 300. Thereby, even though the vehicle 10 is obliquely disposed on the workbench 100, the body center line C of the same position of the vehicle 10 may be determined and measured, such that a measured value may be more accurately obtained by measuring the wheel alignment based on the body center line C.

That is, even though the vehicle 10 is irregularly disposed on the workbench 100, the same front center point A and rear center point B may be determined and measured by the front laser sensors 200 and the rear laser sensors 300, such that the same body center line C may be obtained.

The wheel alignment measuring device for the vehicle according to various embodiments of the present invention as described above uses the body center line of the vehicle 10 as a reference when measuring the wheel alignment, such that the wheel alignment may be more accurately determined and measured.

A wheel alignment measuring system for a vehicle measuring torsion and deflection of a driving shaft and a steering shaft of the vehicle is configured using the wheel alignment measuring device for the vehicle according to various embodiments of the present invention.

Figure 5:
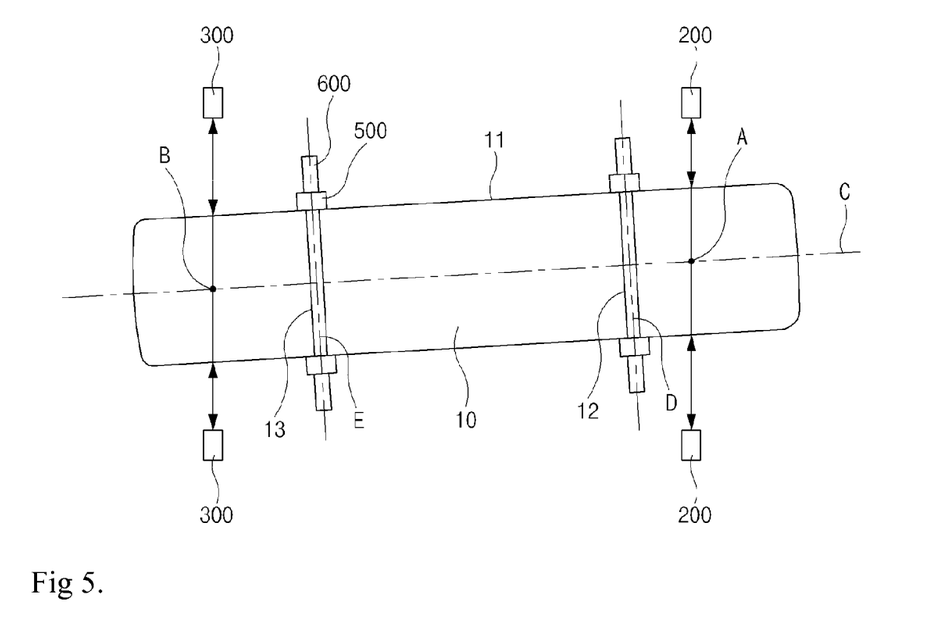
FIG. 5 is a view showing an exemplary wheel alignment measuring system for the vehicle according to the present invention.

That is, the wheel alignment measuring system for the vehicle according to various embodiments of the present invention includes the above described wheel alignment measuring device and wheel clamps 500 and 3D cameras 600 provided at ends of both sides of a steering shaft 12 and a driving shaft 13 of the vehicle 10 and measuring reference lines D and E connecting both ends of the steering shaft 12 and the driving shaft 13 and the center point, as shown in FIGS. 4 and 5.

In other words, the wheel clamps 500 and the 3D cameras 600 for measuring the reference lines D and E connecting both ends of the steering shaft 12 or the driving shaft 13 are provided at both ends of the steering shaft 12 and the driving shaft 13 of the vehicle 10.

In addition, the measuring part 400 measures the wheel alignment by the reference lines D and E and the body center line C measured by the wheel clamps 500 and the 3D cameras 600.

As shown in FIG. 5, as the wheel clamps 500 and the 3D cameras 600 as described above are installed at the ends of the steering shaft 12 and the driving shaft 13 of the vehicle, the reference lines D and E in the length direction of the steering shaft 12 and the driving shaft 13 may be measured and the wheel alignment may be adjusted by comparing the reference lines D and E of the steering shaft 12 and the driving shaft 13 with the body center line C.

Therefore, the wheel alignment measuring system for the vehicle according to various embodiments of the present invention measures an inclined angle of the reference lines D and E of the steering shaft 12 and the driving shaft 13 from the body center line C.

That is, if the inclined angle of the reference line D of the steering shaft 12 from the body center line C is not 90°, it may be appreciated that the deflection occurs. Therefore, the inclined angle of the steering shaft 12 is adjusted so that the deflection does not occur.

In addition, if the inclined angle of the reference line E of the steering shaft 13 from the body center line C is not 90°, it may be appreciated that the torsion occurs. Therefore, the inclined angle of the driving shaft 13 is adjusted so that the torsion does not occur.

Further, the wheel alignment measuring system for the vehicle according to various embodiments of the present invention may simultaneously measure the deflection and the torsion of the steering shaft and the driving shaft, thereby increasing workability and efficiency.

Meanwhile, a wheel alignment measuring method using the wheel alignment measuring system for the vehicle according to various embodiments of the present invention as described above will be described below.

Figure 6:
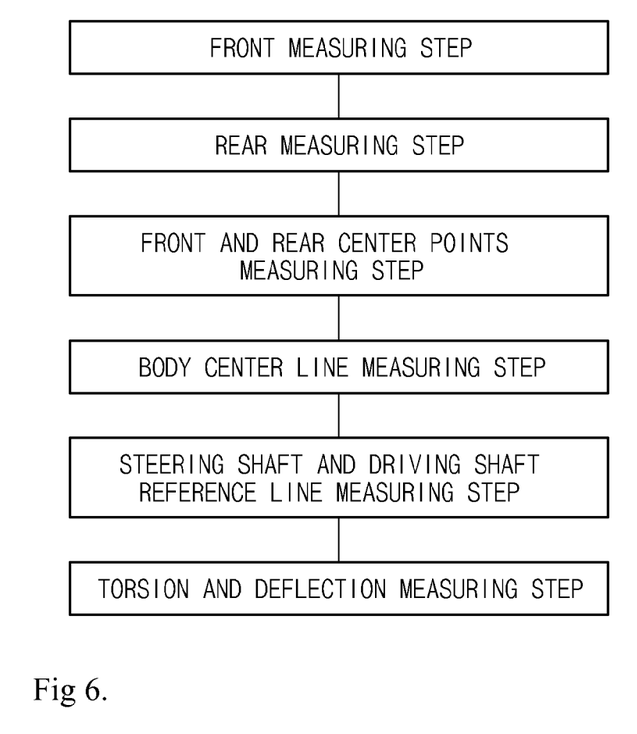
FIG. 6 is a flow chart showing an exemplary wheel alignment measuring method for a vehicle according to the present invention.

As shown in FIG. 6, the wheel alignment measuring method for the vehicle according to various embodiments of the present invention includes a front measuring step of measuring positions of side panels each provided at both sides of a front of a vehicle to obtain two front points, a rear measuring step of measuring positions of side panels each provided at both sides of a rear of the vehicle to obtain two rear points, a front and rear center points measuring step of obtaining a front center point A of a connection line connecting the two front points to each other and a rear center point B of a connection line connecting the two rear points to each other, a body center line measuring step of connecting the front center point A and the rear center point B to each other to obtain a body center line C of the vehicle, a steering shaft or driving shaft reference line measuring step of measuring a reference line D or E of the steering shaft or the driving shaft connecting both ends of the steering shaft or the driving shaft of the vehicle, and a torsion and deflection measuring step of measuring an inclined angle of the reference line D or E of the steering shaft or the driving shaft based on the body center line C to measure torsion and deflection of the driving shaft and the steering shaft of the vehicle.

Hereinafter, the wheel alignment measuring method for the vehicle according to various embodiments of the present invention will be described in detail.

The front measuring step measures the positions of the side panels 11 each provided at both sides of the front at which the steering shaft 12 of the vehicle 10 disposed on the workbench 100 is positioned, by the front laser sensors 200 to thereby obtain the two front points.

Meanwhile, the front measuring step and the rear measuring step are simultaneously performed, where the rear measuring step measures the positions of the side panels each provided at both sides of the rear at which the driving shaft 13 of the vehicle 10 disposed on the workbench 100 is positioned, by the rear laser sensors 300 to thereby obtain the two rear points.

When the front and rear measuring steps are completed, the front and rear center points measuring step is performed, where the front and rear center points measuring step obtains the front center point A of the connection line connecting the two front points to each other measured by the front laser sensors 200 and the rear center point B of the connection line connecting the two rear points to each other measured by the rear laser sensors 300.

Thereafter, the body center line measuring step connects the front center point A and the rear center point B to each other to thereby obtain the body center line C.

When the body center line measuring step is completed, the steering shaft or driving shaft reference line measuring step is performed.

The steering shaft or driving shaft reference line measuring step measures the reference line D or E of the steering shaft 12 or the driving shaft 13 connecting both ends of the steering shaft 12 or the driving shaft 13 by the wheel clamps 500 and the 3D cameras 600 provided at both ends of the steering shaft 12 or the driving shaft 13 of the vehicle 10.

When the steering shaft or driving shaft reference line measuring step is completed, the torsion and deflection measuring step is performed.

The torsion and deflection measuring step measures the inclined angle of the reference line D or E of the steering shaft 12 or the driving shaft 13 to measure the torsion and the deflection of the steering shaft 12 and the driving shaft 13 of the vehicle 10.

That is, the torsion and deflection measuring step measures an angle of the reference line D of the steering shaft 12 based on the body center line C. When the angle of the steering shaft 12 is not 90°, the deflection occurs. Therefore, the angle of the steering shaft 12 is adjusted so as to become 90° with respect to the body center line C.

Meanwhile, the torsion and deflection measuring step measures an angle of the reference line E of the driving shaft 13 based on the body center line C. When the angle of the driving shaft 13 is not 90°, the torsion occurs. Therefore, the angle of the driving shaft 13 is adjusted so as to become 90° with respect to the body center line C.

The wheel alignment measuring method for the vehicle according to various embodiments of the present invention as described above measures the deflection of the steering shaft and the torsion of the driving shaft using the body center line C, such that the measurement may be more accurately performed.

As set forth above, according to various embodiments of the present invention, the straight driving performance of the vehicle such as the driving drift, the unbalanced wear of the tire, the deflected driving, or the like of the vehicle may be improved by measuring the wheel alignment and the deflection based on the body center line of the vehicle.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A wheel alignment measuring system for a vehicle, the system comprising:
    a wheel alignment measuring device comprising:
        a workbench for supporting a vehicle thereon;
        front laser sensors provided at opposing front sides of the workbench to measure positions of front side panels of the vehicle;
        rear laser sensors provided at opposing rear sides of the workbench to measure positions of rear side panels of the vehicle; and
        a measuring unit for determining a front center point A of a connection line connecting front points of the side panels measured by the front laser sensors and a rear center point B of a connection line connecting rear points of the side panels measured by the rear laser sensors, and a body center line C of the vehicle by connecting the front center point A and the rear center point B to each other; and
    wheel clamps and 3D cameras configured to be provided at ends of both sides of a steering shaft or a driving shaft of the vehicle and to measure a reference line connecting both ends of the steering shaft or the driving shaft.

2. The wheel alignment measuring system for the vehicle according to claim 1, wherein the front laser sensors are provided at opposing front sides of the workbench so as to correspond to each other.

3. The wheel alignment measuring system for the vehicle according to claim 1, wherein the rear laser sensors are provided at opposing rear sides of the workbench so as to correspond to each other.

4. The wheel alignment measuring system for the vehicle according to claim 1, wherein the front laser sensors and the rear laser sensors are provided along a common line in a length direction of the vehicle.

5. The wheel alignment measuring system for the vehicle according to claim 1, wherein after measuring a connected state between the reference line of the steering shaft measured by the wheel clamps and the 3D cameras and the body center line, if an angle of the reference line of the steering shaft with respect to the body center line is not 90°, deflection occurs.

6. The wheel alignment measuring system for the vehicle according to claim 1, wherein after measuring a connected state between the reference line of the driving shaft measured by the wheel clamps and the 3D cameras and the body center line, if an angle of the reference line of the driving shaft with respect to the body center line is not 90°, torsion occurs.

7. A wheel alignment measuring method for a vehicle, the method comprising:
    a front measuring step of measuring positions of opposing front side panels of the vehicle to obtain front points;
    a rear measuring step of measuring positions of opposing rear side panels of the vehicle to obtain rear points;
    a front and rear center points measuring step of obtaining a front center point A of a connection line connecting the front points to each other and a rear center point B of a connection line connecting the rear points to each other;
    a body center line measuring step of connecting the front center point A and the rear center point B to each other to obtain a body center line C of the vehicle;
    a steering shaft or driving shaft reference line measuring step of measuring a steering shaft reference line D or a driving shaft reference line E of the steering shaft or the driving shaft connecting both ends of the steering shaft or the driving shaft of the vehicle; and
    a torsion and deflection measuring step of measuring an inclined angle of reference line D or E of the steering shaft or the driving shaft based on the body center line C and then measuring torsion and deflection of the driving shaft and the steering shaft of the vehicle.

8. The wheel alignment measuring method for the vehicle according to claim 7, wherein in the front measuring step, the positions of the side panels each provided at both sides of front of the vehicle are measured by front laser sensors to thereby obtain two front points.

9. The wheel alignment measuring method for the vehicle according to claim 7, wherein in the rear measuring step, the positions of the side panels each provided at both sides of the rear of the vehicle are measured by rear laser sensors to thereby obtain two rear points.

10. The wheel alignment measuring method for the vehicle according to claim 7, wherein in the steering shaft or driving shaft reference line measuring step, a reference line D or E of the steering shaft or the driving shaft connecting both ends of the steering shaft or the driving shaft is measured by wheel clamps and 3D cameras each provided at ends of both sides of the steering shaft or the driving shaft.

11. The wheel alignment measuring method for the vehicle according to claim 7, wherein in the torsion and deflection measuring step, an angle of the reference line D of the steering shaft is measured based on the body center line C, and if the angle of the steering shaft is not 90°, deflection occurs.

12. The wheel alignment measuring method for the vehicle according to claim 7, wherein in the torsion and deflection measuring step, an angle of the reference line E of the driving shaft is measured based on the body center line C, and if the angle of the driving shaft is not 90°, torsion occurs.

* * * * *